Oct. 10, 1961  R. L. DALTON  3,003,712
TAKE-UP SPOOL FOR PHOTOGRAPHIC CAMERAS
Filed March 3, 1959
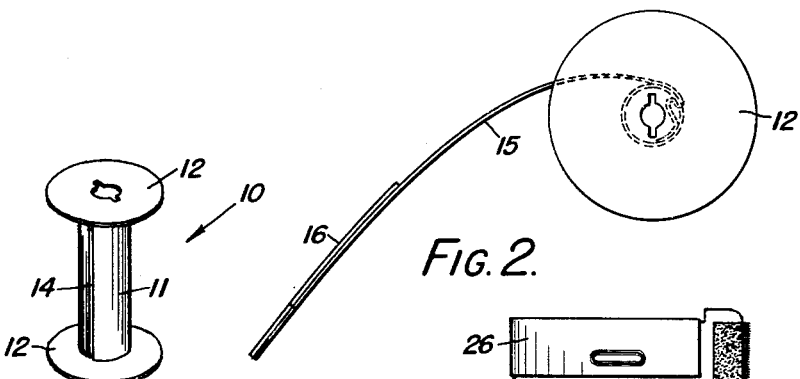
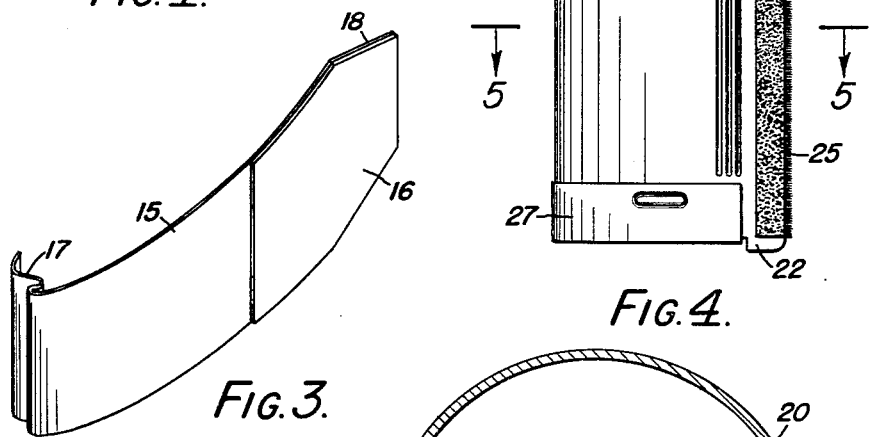
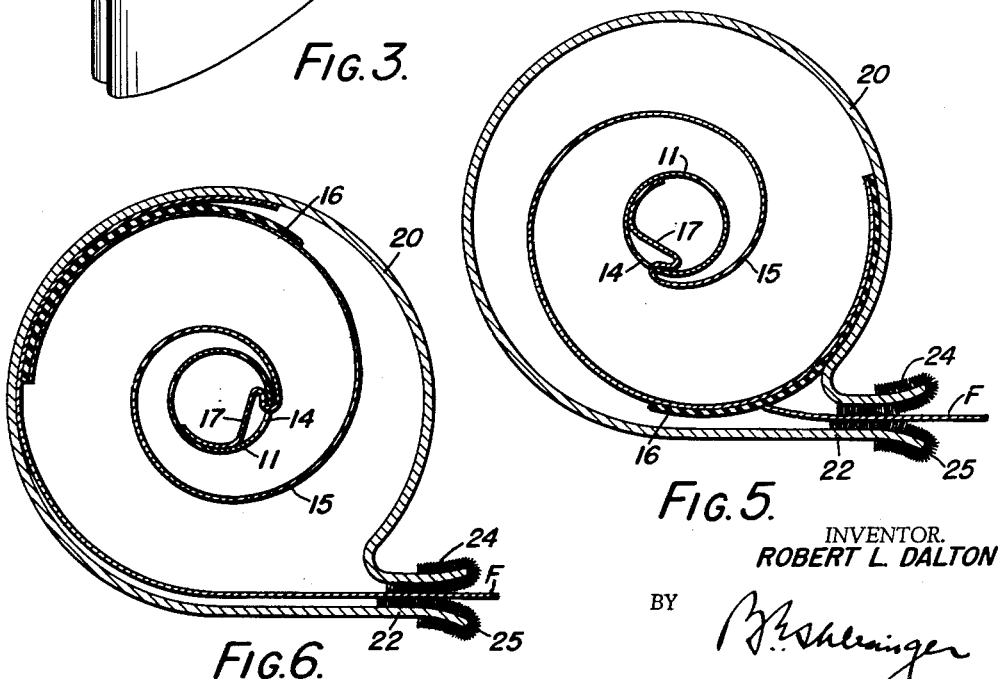
INVENTOR.
ROBERT L. DALTON
BY
ATTORNEY … # 3,003,712
TAKE-UP SPOOL FOR PHOTOGRAPHIC CAMERAS
Robert L. Dalton, Pittsford, N.Y., assignor to Graflex, Inc., Rochester, N.Y., a corporation of Delaware
Filed Mar. 3, 1959, Ser. No. 796,958
1 Claim. (Cl. 242—74)

The present invention relates to spools for use in photographic cameras, and more particularly to take-up spools for use in such cameras. In a more specific aspect, the invention relates to a take-up spool for winding up imperforate film in a film holding cartridge or cassette.

The conventional take-up spool for winding imperforate film into a cartridge or cassette has a tubular shaft or shank with an axially extending slot therein or therethrough. Conventional roll film for amateur use is usually made with a lead end of narrow width which can be inserted into this slot to engage the film with the spool and permit the film to be wound up. It is not always easy to insert the lead end of the film into the slot even when the spool is mounted in an open chamber in the camera and the slot is readily accessible. When the spool is in a cartridge or cassette, where the slot cannot be seen and where the lead end of the film has to be fed blindly through a restricted opening in the cassette in order to reach the spool, the difficulty of threading the lead end of the film into the slot of the spool is so multiplied that ordinarily cassettes are used only to hold the film supply core or spool, not the take-up core or spool; and the take-up core or spool is simply mounted in a readily accessible chamber in the camera. This means that after the film has been exposed, it has been necessary heretofore to rewind the exposed film off of the take-up spool into the supply cassette, before removing the exposed film from the camera. When the film strip is of great length, the rewinding operation takes time and is tedious. Rewinding also increases the possibility of abrasion of the sensitized film surface.

Various expedients have been proposed to avoid the difficulties described. In automatic roll film cameras, for instance, a block of permanent magnetic material may be inserted in the bore of the take-up spool, and a metallic strip made of magnetically attractable material may be secured to the lead end of the film so that when the film is inserted in the cartridge or cassette, the lead end of the film will be immediately attracted to the spool, and can readily be wound thereon. Where perforated film is used, that is, film having perforations along its edges, a member may be mounted on the spool which is provided with hooks to engage in the perforations of the film so as to wind up the film on the spool when the spool is rotated. Neither of these expedients are practical, however, for conventional imperforate roll film for amateur use.

One object of the present invention is to provide means for easily and quickly connecting the lead end of a roll of film to the take-up spool of the film cartridge or cassette to facilitate winding the film on the spool.

Another object of the invention is to provide a take-up spool for use in the film cartridge or cassette so constructed that upon insertion of the lead end of the film into the cartridge or cassette and upon rotation of the spool, the lead end of the film will be engaged automatically and will be wound upon the spool upon rotation thereof.

A further object of the invention is to provide a take-up spool for a camera which will be simple in construction, easy to make and assemble, and relatively low in cost.

Other objects of the invention will be apparent hereinafter from the specification and from the recital of the appended claim.

In the drawing:

FIG. 1 is a view of a conventional film spool such as might be used, for instance, in a standard 35 mm. camera;

FIG. 2 is a plan view on an enlarged scale showing how this spool can be converted to a take-up spool constructed according to the present invention;

FIG. 3 is a perspective view of the tongue, which is inserted into the conventional slot of the spool of FIG. 1 in order to make it a take-up spool according to the present invention;

FIG. 4 is a side elevation of a film cartridge or cassette in which the take-up spool of the present invention may be used;

FIG. 5 is a section through the cassette taken on the line 5—5 of FIG. 4 looking in the direction of the arrows, and showing the position of the spool in the cassette and the lead end of a roll of film being fed into the cassette; and FIG. 6 is a similar sectional view showing the film being wound on the spool.

Referring now to the drawing by numerals of reference, 10 denotes a conventional film spool. This spool has a tubular shank or shaft 11 and end flanges 12. Its shank or shaft is provided with the usual elongate slot 14 which extends parallel to the axis of the spool.

To convert this standard spool 10 to a take-up spool constructed according to the present invention, a strip of flexible material, such as spring brass 15, that has a flat web of rubber 16 or other high-friction gripping material cemented to one side, is affixed to the shank of the spool 10. The spring strip 15 may have its inner end reversely bent on itself, as denoted at 17, and this end may be inserted through the slot 14 in the spool so that it will snap in place and hold the strip 15 securely to the spool. The strip 15 is preferably bent initially so that it is curved longitudinally; and the rubber piece 16 is cemented on the convex or outside of the strip at the free end of the strip and extends a substantial distance inwardly from the free end of the strip 15.

In use, the spool is placed in the cassette which is to serve as the take-up cartridge or cassette of the camera. This cassette may be constructed in conventional manner having, for instance, a body portion 20 made of a thin sheet, such as aluminum, and flexible, and having an axially extending mouth or opening for passage of the film into and out of the cartridge. This mouth or opening, in the cassette shown is bounded by an inturned lip portion 21, and by a lip portion 22 which is generally parallel to the lip portion 21, when the cartridge is closed, and which is flared somewhat outwardly at its extreme end so as to permit ready introduction of the film F into the mouth of the cartridge. Strips of plush 24 and 25 are glued around the lips 21 and 22 to insure light-tightness of the cartridge in use; and the ends of the cartridge are closed by caps 26 and 27. The cassette will have an inside diameter to receive the flanges 12 of the spool comfortably but without any unnecessary sloppiness. This is conventional construction and need not further be described here.

The brass strip 15 extends over a major portion of the axial height or extent of the cassette and may be beveled on opposite sides at its free end as denoted at 18 to avoid sharp corners; and the rubber strip 16 will be shaped correspondingly. The strip 15 has a length considerably greater than the internal diameter of the cassette so that even when the cassette is empty of film the strip will extend spirally in more than one convolution about the spool, and, as illustrated in the drawing, will contact with the inside wall of the cassette through an angle in the order of 75°.

In use, when the lead end of a strip of film F is introduced through the opening or mouth of the cassette and the spool is rotated, the rubber strip 16 frictionally engages and picks up the film and wraps it around the shank or shaft of the spool.

In actual use, it has been found that all that is necessary is to feed the film into the cassette and rotate the spool, the brass tongue and rubber strip will do the rest; it will always wind up the film. There is no hunting and twisting, trying to get the lead end of the film inserted in a slot in the spool.

Furthermore, because the take-up spool of the present invention permits of using a cassette for take-up purposes, rewinding of the film from the take-up spool back into the supply cassette after exposure of the film is obviated. This eliminates the irksome, and time-consuming task of rewinding the film, after exposure, into the supply cassette, and makes it practical to use greater lengths of roll film in a camera than has heretofore been possible. The present invention, therefore, permits of taking a great number of pictures with a single loading and unloading of the camera. Moreover, the take-up spool of the present invention is very simple in construction, and can be assembled quickly.

While the invention has been described in connection with one embodiment thereof, it will be understood that it is capable of further modification, and this application is intended to cover any variations, uses, or adaptations of the invention, following, in general, the principles of the invention, and including such departures from the present disclosure as come within known or customary practice in the art to which the invention pertains and as may be applied to the essential features hereinbefore set forth, and as fall within the scope of the invention or the limits of the appended claim.

Having thus described my invention, what I claim is:

A cartridge for use in a photographic camera comprising in combination, a hollow, approximately cylindical cassette, and a spool mounted in said cassette for rotation on its axis, said cassette being stationary and having an opening through it which extends in the direction of the axis of said spool and which constitutes a mouth through which film may be introduced into the cassette, said spool comprising a rotatable shaft, and a resilient spring strap affixed at one end to said shaft and projecting from said shaft outwardly toward the inside surface of said cassette and windable about said shaft, said strap extending over a major portion of the axial extent of said cassette and having a flat web of friction material affixed to the side thereof that faces away from said shaft, said web extending a substantial distance inwardly from the free end of said strap, said strap having a length considerably greater than the internal diameter of said cassette so that even when said cassette is empty of film said strap will extend spirally in more than one convolution about said shaft to have contact with the inside surface of said cassette through an angle in the order of 75°, whereby upon rotation of said spool film introduced through said opening will be engaged by said web and wound upon said spool.

References Cited in the file of this patent

UNITED STATES PATENTS

| | | |
|---|---|---|
| 1,304,021 | Carter | May 20, 1919 |
| 1,498,133 | Swem et al. | June 17, 1924 |
| 2,702,673 | Steiner | Feb. 22, 1955 |
| 2,719,679 | Nerwin et al. | Oct. 4, 1955 |
| 2,734,692 | Robinson | Feb. 14, 1956 |

FOREIGN PATENTS

| | | |
|---|---|---|
| 924,378 | France | Mar. 10, 1947 |